(12) United States Patent
Mahkonen et al.

(10) Patent No.: US 9,912,788 B2
(45) Date of Patent: Mar. 6, 2018

(54) SYSTEMS AND METHODS OF AN ENHANCED STATE-AWARE PROXY DEVICE

(71) Applicant: Telefonaktiebolaget L M Ericsson (publ), Stockholm (SE)

(72) Inventors: Heikki Mahkonen, San Jose, CA (US); Meral Shirazipour, San Jose, CA (US); Ravi Manghirmalani, Fremont, CA (US); Ming Xia, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 112 days.

(21) Appl. No.: 14/937,613

(22) Filed: Nov. 10, 2015

(65) Prior Publication Data

US 2017/0134538 A1    May 11, 2017

(51) Int. Cl.
*H04L 29/06* (2006.01)
*H04L 29/08* (2006.01)
*H04L 12/46* (2006.01)

(52) U.S. Cl.
CPC .......... *H04L 69/22* (2013.01); *H04L 12/4633* (2013.01); *H04L 67/28* (2013.01)

(58) Field of Classification Search
CPC ...... H04L 69/22; H04L 67/28; H04L 12/4633
See application file for complete search history.

(56) References Cited

U.S. PATENT DOCUMENTS

| 8,442,043 | B2 | 5/2013 | Sharma et al. |
| 2014/0334488 | A1 | 11/2014 | Guichard et al. |
| 2014/0362857 | A1* | 12/2014 | Guichard .............. H04L 45/566 370/392 |
| 2015/0103827 | A1 | 4/2015 | Quinn et al. |
| 2016/0139939 | A1* | 5/2016 | Bosch ................... H04W 4/003 718/1 |
| 2016/0308734 | A1* | 10/2016 | Feller .................. H04L 41/5009 |
| 2016/0330111 | A1 | 11/2016 | Manghirmalani et al. |

OTHER PUBLICATIONS

Kumar etc. "Infrastructure Service Forwarding for NSH", draft-kumar-sfc-nsh-forwarding-00, Feb. 15, 2016.*
"Service Function Chaining (sfc)", <https://datatracker.ietf.org/wg/sfc/charter>, version 6.4.1.p2, Sep. 10, 2015, 4 pages.
Halpern et al., "Service Function Chaining (SFC) Architecture; draft-ietf-sfc-architecture-11", Network Working Group, Internet-Draft, Jul. 24, 2015, pp. 1-30.
(Continued)

*Primary Examiner* — Jianye Wu
(74) *Attorney, Agent, or Firm* — Nicholson De Vos Webster & Elliott LLP

(57) ABSTRACT

A method and apparatus for an enhanced proxy device are described. Upon receipt of a first packet with a header including a set of header fields, a proxy device stores a subset from the set of header fields with an identification of the first packet, wherein the identification of the first packet is based on a portion of the packet; and transmits the packet without the subset of the header fields to be processed at the processing device.

14 Claims, 9 Drawing Sheets

(56) References Cited

OTHER PUBLICATIONS

Quinn et al., "Network Service Header; draft-ietf-sfc-nsh-01.txt", Network Working Group, Internet-Draft, Jul. 23, 2015, pp. 1-43.
"IPR Details; Huawei Technologies Co., Ltd's Statement about IPR related to draft-quinn-sfc-nsh", <https://datatracker.ietf.org/ipr/2547/>, Mar. 9, 2015, 3 pages.
"IPR Details; Cisco Systems, Inc.'s Statement about IPR related to draft-quinn-sfc-nsh", <https://datatracker.ietf.org/ipr/2545/>, Mar. 6, 2015, 3 pages.
"IPR Details; Cisco's Statement of IPR Related to draft-quinn-nsh-00", <https://datatracker.ietf.org/ipr/2108/>, Jun. 19, 2015, 3 pages.
Ravi Manghirmalani et al., "Packet Marking for L4-7 Advanced Counting and Monitoring", U.S. Appl. No. 14/705,859, filed May 6, 2015, pp. 1-42.
"Dynamic Service Chaining With SDN", Ericsson (EUS), May 2014, pp. 1-4.
Rijsman et al., "Metadata Considerations; draft-rijsman-sfc-metadata-considerations-00.txt", Service Function Chaining (SFC), Internet Draft, Feb. 12, 2014, pp. 1-30.
Khakpour et al., "Firewall Fingerprinting", INFOCOM Proceedings IEEE, Mar. 2012, 9 pages.
Eugen Feller et al., "System and Method for SLA Violation Mitigation via Multi-Level Thresholds", U.S. Appl. No. 14/689,040, filed Apr. 16, 2015, pp. 1-25.
Halpern et al., "Service Function Chaining (SFC) Architecture", Internet Engineering Task Force (IETF), Request for Comments: 7665, Oct. 2015, pp. 1-32.
A. Cabellos et al., "Map-Assisted SFC Proxy using LISP; draft-cabellos-sfc-map-assisted-proxy-00.txt", Network Working Group, Internet-Draft, Oct. 19, 2015, 6 pages.

\* cited by examiner

400

```
┌─────────────────────────────────────────────────────────────────────┐
│ In response to receiving a second packet as a result of the         │
│ processing of the first packet by the processing device, retrieving │
│ the subset of header fields associated with the first packet        │
│ according to an identification of the second packet, wherein the    │
│ identification of the second packet is identical to the             │
│ identification of the first packet prior to its processing          │
│ at the processing device                                            │
│ 410                                                                 │
└─────────────────────────────────────────────────────────────────────┘
                                    │
                                    ▼
┌─────────────────────────────────────────────────────────────────────┐
│ Encapsulate the packet with a header associated with the packet     │
│ 412                                                                 │
│                                                                     │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│    Retrieve the stored header according to the identification       │
│  │ of the packet                                                  │ │
│    422                                                              │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│                                                                     │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│    Re-classify the packet to determine the header                   │
│  │ 424                                                            │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
└─────────────────────────────────────────────────────────────────────┘
                                    │
                                    ▼
┌─────────────────────────────────────────────────────────────────────┐
│ Add the retrieved subset of header fields to the packets            │
│ 414                                                                 │
└─────────────────────────────────────────────────────────────────────┘
                                    │
                                    ▼
┌─────────────────────────────────────────────────────────────────────┐
│ Transmit the packet with the header and the retrieved subset of     │
│ markers                                                             │
│ 416                                                                 │
└─────────────────────────────────────────────────────────────────────┘
```

Figure 4

SYSTEMS AND METHODS OF AN ENHANCED STATE-AWARE PROXY DEVICE

FIELD

Embodiments of the invention relate to the field of packet networks, and more specifically, to an enhanced state-aware proxy device.

BACKGROUND

With recent technological advancements such as Software-Defined Networking (SDN) and Network Function Virtualization (NFV), operators have coined the term "service chaining" to mean the differentiated forwarding of traffic flows across a policy defined set of middle boxes (also commonly referred to as services, inline services, appliances, network functions/vNFs in case of NFV, or Service Functions (SF)). Examples SFs include firewalls, content filters, Intrusion Detection Systems (IDS), Deep Packet Inspection (DPI), Network Address Translation (NAT), content caches, load-balancers, Wide Area Network (WAN) accelerators, multimedia transcoders, logging/metering/charging/advanced charging applications, etc.

Service chaining requires a classification process to forward packets on the correct service chain (or service function path (SFP)), followed by the differentiated forwarding/routing of the traffic flow across the right set of SFs or service function path (SFP). Given the importance of this networking use case, the Internet Engineering Task Force (IETF) is developing protocols that will allow more efficient ways to implement SFCs. The IETF is working on the definition of a Network Service Header (NSH) that will be applied to packets by a classifier ("Network Service Header", IETF standards track draft, "draft-ietf-sfc-nsh-01,"). Then Service Function Forwarders (SFFs) will create the Service Function Paths (SFP) in the form of an overlay. IETF's solution is applicable to both physical Network Functions (NF) and virtual NFs (vNF) as defined by European Telecommunications Standards Institute (ETSI) Network Functions Virtualization (NFV), referred to as SF in IETF.

IETF standards track draft, "Network Service Header" ("draft-ietf-sfc-nsh-01") describes that the NSH is composed of the following elements: Service path identification, Transport independent per-packet/frame service metadata, and optional variable TLV metadata. The NSH is appended to an IP packet as performed in a standard encapsulation tunneling mechanism. The NSH and the payload can then be encapsulated in an outer transport header.

There are various reasons why network operators desire to measure traffic in their networks. Network measurement, for example, provides the data required for better network control, enabling the operator to characterize the state of the network, the traffic demands, and the actual consumption of network resources. Network measurement also enables troubleshooting and may prevent service-level agreement (SLA) violations before they occur.

A network controller (e.g., an SDN controller) can program SFFs (and SFs) to add information (markers) to the packets while forwarding them. The markers (e.g., transport independent per-packet/frame service metadata, optional variable TLV metadata or other types of metadata) are added to the NSH header. The markers can include timestamps, packet coloring, packet intercept (data collection instructions), etc. The markers are added to each packet when the packet traverses the classifier and/or SFFs and SFs in the network and can be collected and sent (e.g., by an egress SFF) to a data collector (e.g., an SDN controller or another node in the network). The markers are used for various monitoring tasks such as detecting latency, loss, jitter, etc.

SUMMARY

One general aspect includes a method in a network device coupled with a processing device, including: receiving a packet with a header including a set of header fields associated with the packet; storing a subset from the set of header fields with an identification of the packet, where the identification of the packet is based on a portion of the packet that remains substantially identical prior to and following the processing of the packet at the processing device; and transmitting the packet without the subset of the header fields to be processed at the processing device.

One general aspect includes a method in a network device including: in response to receiving a packet following its processing at a processing device, retrieving a subset of header fields associated with the packet according to an identification of the packet, where the identification of the packet is based on a portion of the packet that remains substantially identical prior to and following the processing of the packet at the processing device; adding the retrieved subset of header fields to the packet; and transmitting the packet with the retrieved subset of header fields.

One general aspect includes a network device, including: a set of one or more processors; and a non-transitory computer readable storage medium coupled with the set of one or more processors, storing instructions that when executed by the set of one or more processors cause the network device to receive a packet with a header including a set of header fields associated with the packet; to store a subset from the set of header fields with an identification of the packet, where the identification of the packet is based on a portion of the packet that remains substantially identical prior to and following the processing of the packet at the processing device. The network device is further operative to transmit the packet without the subset of the header fields to be processed at the processing device.

One general aspect includes a network device, including: a set of one or more processors; and a non-transitory computer readable storage medium coupled with the set of one or more processors, storing instructions that when executed by the set of one or more processors cause the network device, in response to the receipt of a packet following its processing at a processing device, to retrieve a subset of header fields associated with the packet according to an identification of the packet, where the identification of the packet is based on a portion of the packet that remains substantially identical prior to and following the processing of the packet at the processing device. The network device is further operative to add the retrieved subset of header fields to the packet; and to transmit the packet with the retrieved subset of header fields.

BRIEF DESCRIPTION OF THE DRAWINGS

The invention may best be understood by referring to the following description and accompanying drawings that are used to illustrate embodiments of the invention. In the drawings:

FIG. 4 illustrates a flow diagram of exemplary operations for retrieving a state of a packet at a proxy network element in accordance with some embodiments of the invention.

DESCRIPTION OF EMBODIMENTS

Figure 1:
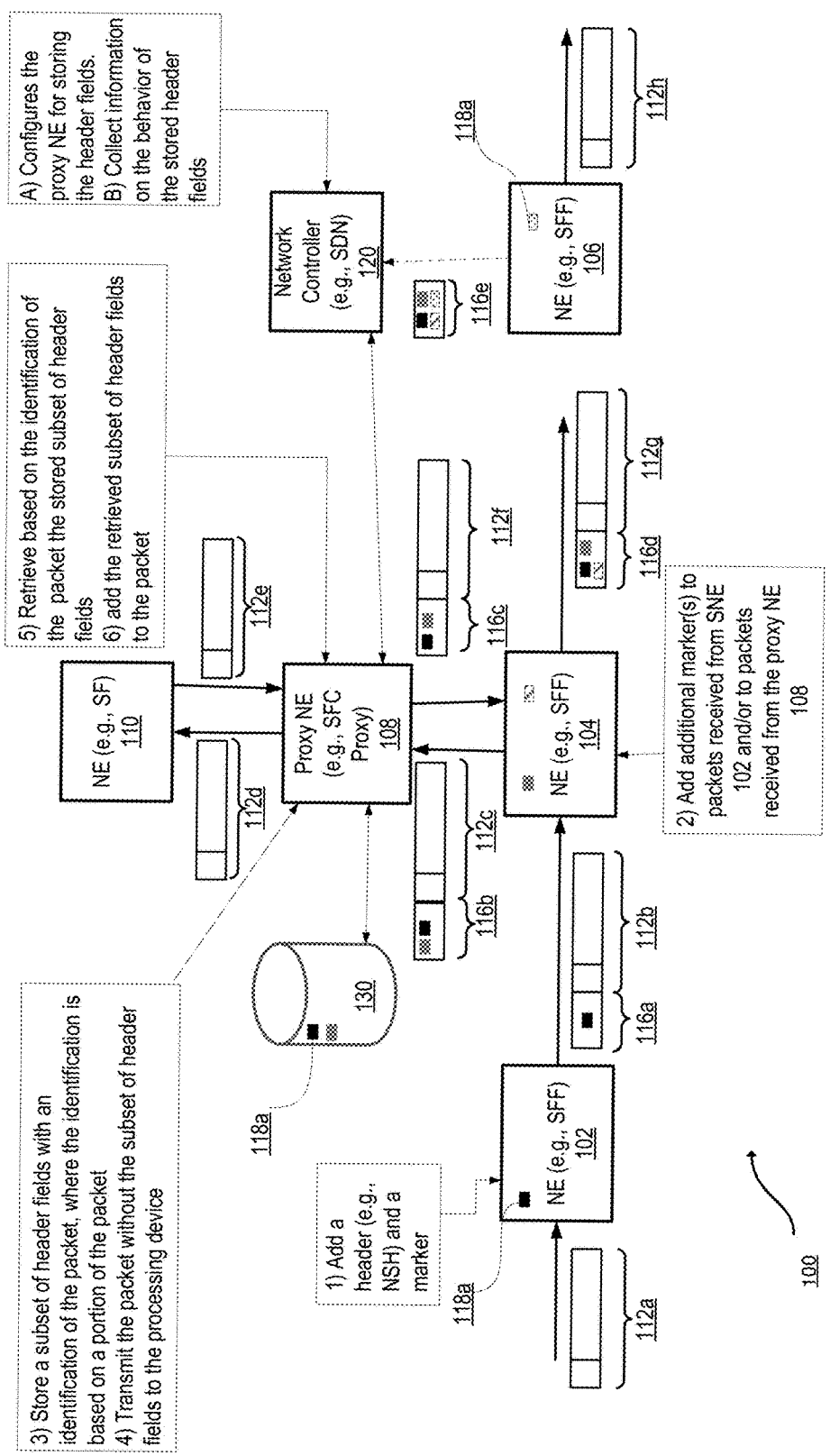
FIG. 1 illustrates a block diagram of an exemplary network including a state-aware proxy network element in accordance with some embodiments of the invention.

The following description describes methods and apparatus for systems and methods of an enhanced state-aware proxy device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

In a deployment scenario where packets are encapsulated with NSH headers, an encapsulated packet (including a payload and the NSH header) is forwarded from a SFF to a SF to be processed with the NSH header and any header fields that the NSH header may include. In this scenario the SF needs to be aware of the NSH header and need to process the encapsulated packet.

However legacy SFs (or SFC-unaware SF) do not support NSH header and they are not enabled to process NSH encapsulated packets. For these SFs the SFC architecture provides proxy NE function that decapsulates the NSH header before passing the original packet (i.e., the payload of the NSH encapsulated packet) to the SF and encapsulates packets coming from SF before sending them back to an SFF through a re-classification process. The SFC architecture described in "Service Function Chaining (SFC) Architecture", IETF Request for Comment (RFC) 7665, mentions that when traffic at a proxy NE arrives after being steered through an SFC-unaware SF, the SFC Proxy performs reclassification of traffic to determine the Service Function Path (SFP). The SFC Proxy is concerned with re-attaching information for SFC-unaware SFs, and a state-aware SFC Proxy may simplify such classification to a flow lookup.

A network controller (e.g., an SDN controller) can program SFFs (and SFs) to add information (markers) to the packets while forwarding them. The markers (e.g., transport independent per-packet/frame service metadata, optional variable TLV metadata or other types of metadata) are added to the NSH header. The markers can include timestamps, packet coloring, packet intercept (data collection instructions), etc. The markers are added to each packet when the packet traverses the classifier and/or SFFs and SFs in the network and can be collected and sent (e.g., by an egress SFF) to a data collector (e.g., an SDN controller or another node in the network). The markers are used for various monitoring tasks such as detecting latency, loss, jitter, etc.

Packet header marking is usually performed per packet rather than per SFC and as such, packet header markers are not restored through the re-classification process at the proxy NE. Thus, in this approach re-classification does not guarantee that the metadata (header markers) carried in each packet will be restored as well, as they only require the main NSH header necessary to assign the packet to a SFP.

In a basic proxy NE scenario, when a packet enters the proxy NE, the proxy discards the NSH header together with collected header markers and forwards the packets to be processed at an SF node. Thus, when the packet returns from the SF node, the proxy NE only encapsulates packets with NSH headers that can be mapped to a particular SFP (i.e. the proxy NE re-classifies the returned packet to a particular SFP). This packet re-classification is performed based on 5-tuple (i.e., source/destination port, source/destination IP address, protocol) or other information in the packet. However the NSH header resulting from the re-classification does not include the header markers collected within the network prior to the processing of the packet at the SF node.

In another approach, the proxy NE may store the NSH header together with the collected header markers and add them back to the packet after the processing at the SF. However this approach has the limitation that there is no guarantee that the markers are added back to the corresponding original packet as the SF might delay, reorder, drop, or generate some packets as part of the packet processing. Further, when the proxy NE is implemented as a state-aware proxy NE, the proxy NE is not able to retrieve the stored state (e.g., the NSH header) corresponding to the packet when the packet is altered during its processing at the SF node. In addition, certain SFs (e.g., SFs that act as connection proxies) might alter the packet flow completely by terminating the original flow and initiating a new one, or creating additional packets for each packet received. Thus, certain packets may not return from the SF resulting in the SF proxy storing states for packets that are no longer needed.

Even though the approaches described above are described with reference to an NSH header including metadata information (markers) and a proxy NE receiving the encapsulated packets, one of ordinary skill in the art would understand that these approaches additionally apply to any proxy node in a network which receives packets including header with metadata information, which decapsulates the packets and forwards them for further processing at another network node coupled with the proxy node. These proxy nodes also contemplate the limitations of the approaches presented above.

The embodiments described herein present methods and apparatuses for an enhanced state-aware proxy. The methods and apparatuses further provide a machine learning framework to optimize the storage and management of a state kept for each packet.

The methods and apparatuses presented herein describe a proxy network element coupled with a processing device, which, upon receipt of a packet with a header and a set of header fields associated with the packet, stores a subset from the set of header fields with an identification of the packet. The identification of the packet is based on a portion of the packet that remains substantially identical prior to and following the processing of the packet at a processing device. The proxy network element transmits the packet without the subset of markers to be processed at the processing device. In response to receiving the packet back to the proxy network element following its processing at the processing device, the proxy network element retrieves the subset of header fields associated with the first packet according to an identification of the processed packet, wherein the identification of the second packet is based on a portion of the processed packet that is substantially identical to the portion of the packet prior to its processing at the processing device. The proxy network element adds the retrieved subset of header fields to the packet; and transmits the packet with the retrieved subset of header fields. The embodiments presented herein ensure that packet markers collected when a packet traverses a network (e.g., NSH metadata markings) are handled correctly and are retained in corresponding packets while traversing a proxy node.

In additional embodiments, it is described how an proxy NE is used to participate in the NSH marking as described in U.S. patent application Ser. No. 14/705,859, entitled "Packet marking for K4-7 advances counting and monitoring," which is incorporated herein by reference.

FIG. 1 illustrates a block diagram of a network 100 (e.g., SFC) including a state-aware proxy network element in accordance with some embodiments. The network 100 includes NE 102, NE 104, NE 106, proxy NE 108 coupled with the NE 110 (e.g., SF). The network further includes a network controller 120. In one exemplary embodiment, each one of the NEs 102, 104, and 106 is a network element (or virtual network element) implementing a Service Function Forwarder. The service function forwarder may perform any forwarding plane functions (e.g., switching, routing,) that can participate in the routing/forwarding of packets that belong to a flow (i.e., the SFFs may forward packet flows associated to a SFC based on the NSH header of the packets). The service function forwarder may also include counting and monitoring functions co-residing with the routing/forwarding functionalities. In the illustrated exemplary embodiment, NE 102 is the first in a chain of network elements (NEs) that include NE 102 followed by NE 104 (this is sometimes referred to as dynamic service chaining, where each of the NE in the series of NEs provides a different service—e.g., one or more layer 4-7 network services). NE 104 is coupled with a proxy NE 108 (e.g., an proxy NE), which is coupled with a NE 110. In a non-limiting exemplary embodiment, the NE 110 is a network element implementing a service function in a service function chaining network. For example, the NE 110 may provide a Network Address Translation (NAT) service, an Internet Database Service (DBaaS) or a Deep Packet Inspection (DPI), a firewall service, a content filtering service, Intrusion Detection Systems (IDS), content caches, load-balancers, Wide Area Network (WAN) accelerators, multimedia transcoders, logging/metering/charging/advanced charging applications, etc. While FIG. 1 illustrates various exemplary relationships between the NEs, alternative embodiments may support other relationships (e.g., more/fewer NEs, more/fewer dynamic service chains, multiple different dynamic service chains with some common NEs and some different NEs). For example, the proxy NE 108 may be coupled with more than one SF, such that packets are processed in a series of SFs prior their return to the proxy NE 108.

In an embodiment, the NEs 102, 104 and 106, as well as the proxy network element 108 are operative to support NSH headers and to mark each of the packets received with metadata information (e.g., markers) within header fields of the NSH header. NE 102 is an ingress network element to the network, and upon receipt of a packet 112a (e.g., the packet is a L3/L4 packet and includes a header and a payload), the NE 102 encapsulates the packets with a header (e.g., NSH). Optionally the NE 102 may add (operation (1)) a header marker 118a to the packet. In an embodiment, the header marker is included in an extension to the header and can include metadata such as timestamp data, packet coloring data, packet intercept data, etc.

Following its processing at the NE 102, the packet including the payload 112b and the header 116a is forwarded to NE 104. In an embodiment, NE 104, adds (operation (2)) an additional marker to the packet and forwards the packet to the proxy NE 108 to be forwarded to the NE 110.

The proxy NE 108 is operative to receive a packet (e.g., an NSH packet) and to store (operation 3) one or more header fields of the packet in the storage 130. Thus upon receipt of the packet 112c with the header 116b, (where packet 112c is the packet 112b following its processing at NE 104), the proxy NE 108 stores a subset of header fields from the header 116b along with an identification of the packet. In some embodiments, the identification is based on a portion of the packet that remains substantially identical prior to and following the processing of the packet at the processing device NE 110. In other embodiments, the identification is based on a portion of the packet that is dynamically determined according to a machine learning mechanism. In an embodiment, the proxy NE 108 stores all the header fields included in the header 116b, along with the identification of the packet. In another embodiment, the proxy stores a subset of the header fields, where the subset is less than all of the header fields included within the header of the packet. For example, the proxy NE 108 may be operative to store only the header fields including markers of type timestamp and discard markers of type coloring. In some embodiments, the markers are included as header extensions to the main NSH header field, and they are stored with the main NSH header field along with the identification of the packet for each packet received at the proxy NE 108. While the storage 130 is illustrated as being separate from the proxy NE, one would understand that the present embodiments are not so limited. The storage 130 may be included within the same network device implementing the proxy NE 108. In other embodiments, the storage 130 is located within another electronic device coupled with the proxy NE 108. The communication link between the proxy NE 108 and the storage 130 enables the proxy NE 108 to store and retrieve states of packets based on an identification of each packet, where the state of each packet includes at least one header field. In an embodiment, the state may further include additional information such as a time expiration value. The storage 130 is a machine-readable storage media (e.g., magnetic disks, optical disks, read only memory (ROM), flash memory devices, phase change memory, etc.).

Once the header fields are stored with the identification of the packet, the packet (including payload 112d) is then transmitted (operation 4) to the NE 110 to be processed. The packet 112e is received at the proxy NE 108 as a result of the processing of the packet 112d at the SF 108. The proxy NE 108 retrieves (operation 5) based on the identification of the packet, the stored subset of header fields, and encapsulates the packets with an associated header. The retrieved subset of header fields 116c are added (operation 6) to the packet 112f and transmitted to the NE 104. NE 104 may further process and mark the packet, which is forwarded (as packet 112g with header 116d) to NE 106. In an embodiment, NE 106 may mark the packet and may optionally collect all markers (116e) and transmits them to the network controller 120. In some embodiments the identification of the packet returning from the NE 110 is based on a portion of the packet that is substantially identical to a portion of the packet prior to its processing at the NE 110. In some embodiments, the identification of the returning packet is generated based on a portion of the packet different from the portion used to generate the identification of the packet prior to its processing at the NE 110. These two portions (prior to and post the processing of the packet at the NE 110) are determined based on a machine learning mechanism as will be described in further details below.

The network controller 120 is used to configure the proxy NE 108 with appropriate parameters. In one embodiment, the network controller 120 is operative to configure new functionality based on the type of processing performed at the NE 110 the proxy NE 108 is serving. For example, if the NE 110 is a NAT, the NE 110 will alter certain portions of the packet making identification of the packet impossible using those changed portions. Thus the network controller 120 is operative to select an appropriate portion of the packet to be used for the determination of the identification of the packet where the portion of the packet depends on the type of the service performed at the NE 110. Consequently ensuring that the packet is identified prior to and following its processing at the NE 110 according to this portion of the packet. In addition, if NE 110 includes an IDS or a DPI it causes different delays to the packet streams than for example a FW or a NAT and the network controller is operative to select an appropriate portion of the packet. In some embodiments, the network elements (NE 102, 104, 106, 108, and 110) and the network controller 120 are implemented according to the embodiments described with reference to FIGS. 6A-F and 7. For example, the proxy NE 108 may be implemented on a single network device or distributed over multiple network devices.

Figure 2A:
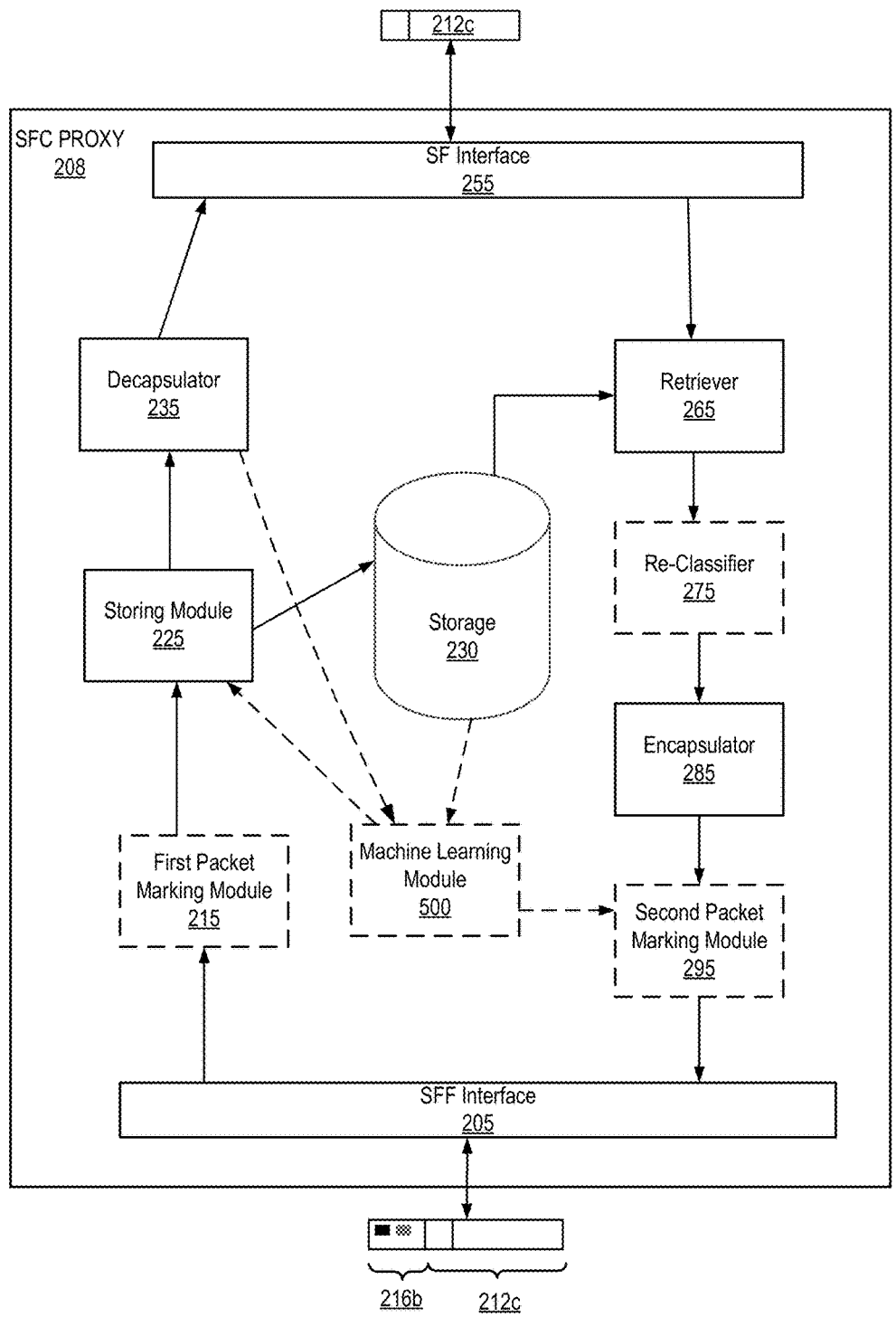
FIG. 2A illustrates an exemplary state-aware proxy network element in accordance with some embodiments of the invention.

FIG. 2A illustrates an exemplary state-aware proxy network element of an SFC network in accordance with some embodiments. The embodiments below will be described with respect to the example of a network element acting as an SFC proxy coupled with a SF within an SFC network. The SFC proxy 208 receives a first packet including the payload 212c and the header 216b through the SFF interface 205. For example the SFF interface 205 is coupled with an SFF (not illustrated). The header 216b includes a set of zero or more header fields. Some of the header fields include markers added to the packet while it traversed the SFC network and prior to reaching the SFC proxy 208. In an embodiment the packet is forwarded to a first packet marking module 215 of the SFC proxy 208. This first packet marking module 215 is optional and may be skipped. The first packet marking module 215 is operative to mark the packet (e.g., to include a timestamp in a header field of the header 216b). The packet is then forwarded to a storing module 225 which is operative to determine an identification of the packet, and to store one or more header fields of the packet with the determined identification.

In an embodiment, the identification of the packet is a fingerprint calculated from a portion of the decapsulated packet (e.g., the payload 212c). In other embodiments, the identification is a fingerprint calculated from a portion of the entire packet including the payload 212c and the header 216b. In some embodiments, the identification of the packet is a fingerprint of the packet calculated from an invariant or quasi-invariant portion of the packet prior to and following its processing at the SF. In some embodiments, this portion is a fixed part of the packet which is known not to vary when the packet is processed at the SF. In other embodiments, this portion is not fixed and is determined dynamically with a machine learning algorithm based on historical data acquired during processing of packets at the SF as will be described in further detail with reference to FIG. 5 below.

In some embodiments, the packet header fields (e.g., NSH header and metadata) are stored with a timer value indicating an expiration period after which the stored header fields are to be discarded. Thus, for each packet received a subset of header fields are stored with the identification of the packet as well as the expiration timer value. Each time a state (including a subset of header fields from the NSH header for the packet) is stored for a packet, a timer is initiated and when the timer expires (i.e., when the timer reaches the expiration timer value) the data stored for this particular packet is discarded freeing up space in the storage 30. This prevents the data storage 230 from filling up with stored data and is useful for example in a case where the SF (e.g., a firewall) drops the packets for which the proxy NE 208 had created a state (e.g., the NSH header and markers).

The packet is forwarded to the decapsulator 235, which removes the header and transmits the packet to the SF interface 255 to be forwarded to the SF for processing. Although the decapsulator 235 is described as receiving the packet from the storing module 225 following the storage of the header fields, the embodiments herein are not so limited. The order of operations within the SFC proxy 208 may be different. For example, the decapsulator may follow the storing module, or additionally the operations of decapsulation and storing may be performed in a single module.

Once the packet re-enters the SFC proxy 208 from the SF as the second packet 212c through the SF interface 255, the retriever 265 retrieves the stored packet header fields by using the identification of the packet. In an embodiment, the identification of the packet is determined based on a portion of the packet that remains substantially identical prior to and following the processing of the packet at the SF, the retriever 265 following the determination of the identification of the packet retrieves the stored header fields from the storage 230. In an embodiment, the identification of the packet is based on a portion of the packet that is different from the one used to generate the identification prior to the processing of the packet at the SF. In some embodiments, the packet is then transmitted to the re-classifier which regenerates a main NSH header field for the packet identifying the NSP. This NSH header may be identical or different from the NSH header of the packet prior to its processing at the SF. For example, the SF may alter the packet such that the re-classification may result in the generation of a new NSH header causing the packet to be forwarded towards an updated service path.

The NSH header, and the retrieved header fields are then transmitted to the encapsulator 285 which adds them to the packet and forwards the encapsulated packets to the second packet marking module 295. The second packet marking module 295 marks the packet. For example, the marking can be performed to collect delay caused by the SF as a marker to be stored into the NSH header metadata/markers. Alternatively, in some embodiments, the second packet marking module 295 is optional, and the encapsulated packet including the NSH header fields is sent directly to the SFF interface 205. In some embodiments, the first packet marking module 215 and the second packet marking module 295 are a single marking module used to keep track of the behavior of the packet prior to and following its processing at the SF. In other embodiments, the main NSH header field of the packet was stored as part of the one or more header fields at the storage 230, and the re-classifier 275 is skipped. In these embodiments, the main NSH header field is retrieved from the storage device based on the identification of the packet and is used to encapsulate the packet at the encapsulator 285.

In some embodiments, the SFC proxy 208 may further include an optional machine learning module 500, as will be described in further details below with reference to FIG. 5. The machine learning module 500 enables the dynamic configuration of the SFC proxy 208 with appropriate parameters for processing a given flow of packets. The machine learning module 500 learns the behavior of each flow during its processing at the proxy network element 208 and following its processing at the SF and determines proper expiration time values as well as portion of the packets to use for generating the identification of the packets.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2B:
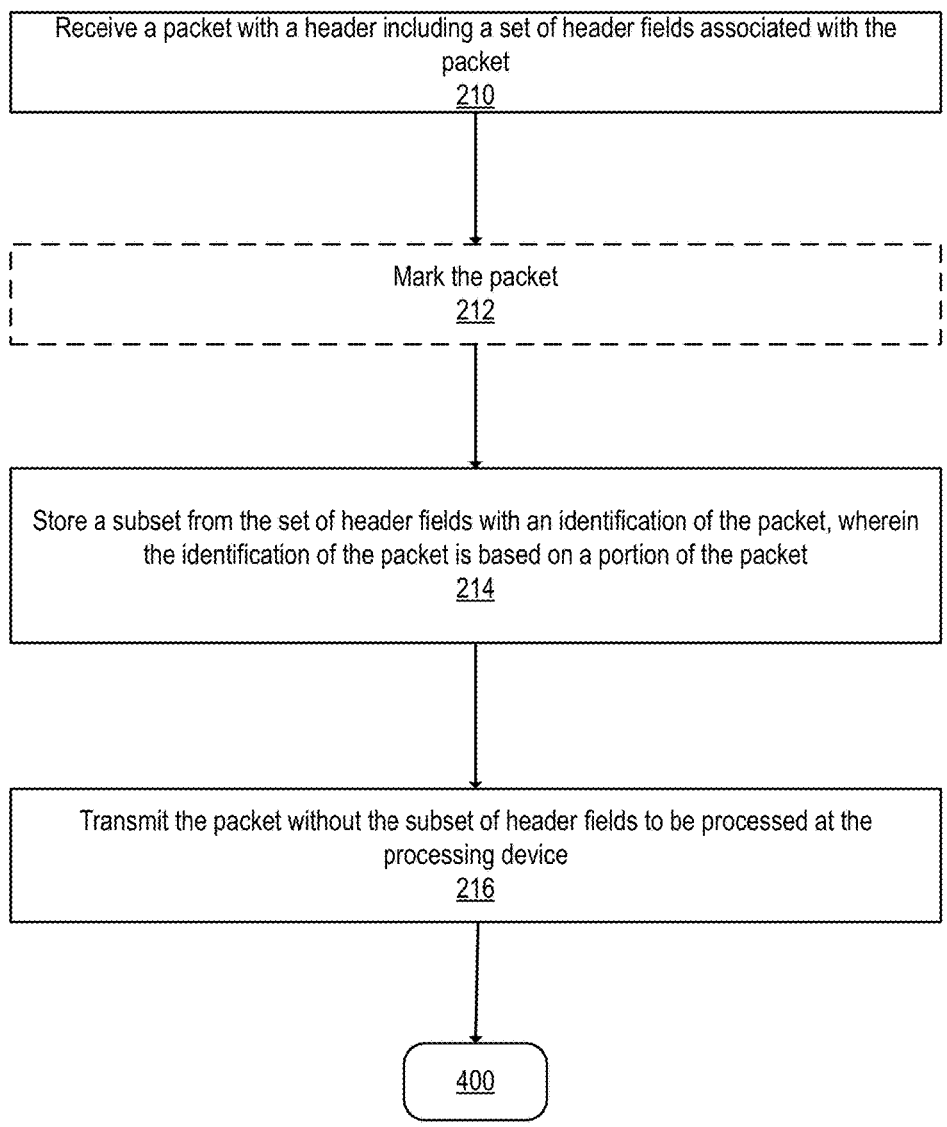
FIG. 2B illustrates a flow diagram of exemplary operations performed in a state-aware proxy network element in accordance with some embodiments of the invention.

FIG. 2B illustrates a flow diagram of exemplary operations performed in a state-aware proxy network element in accordance with some embodiments. At block 210, the proxy NE (108, 208) receives a packet with a header including a set of header fields associated with the packet. In some embodiments, some header fields include metadata information added to the header of the packet by various network elements traversed by the packet prior to reaching the proxy NE. The flow of operations then moves to optional block 212, at which the packet is marked at the proxy NE 108. Flow then moves from block 212 to block 214. At block 214, the proxy NE (108, 208) stores a subset from the set of header fields with an identification of the packet. In an embodiment, the identification of the packet is based on a portion of the packet that remains substantially identical prior to and following the processing of the packet at a processing device. In an embodiment, the identification of the packet is based on a portion of the packet that is different from the one used to generate the identification prior to the processing of the packet at the SF. In some embodiments, the storage of the header fields is performed during a decapsulation operation at which the encapsulation header of the packet is removed (e.g., at decapsulator 235, in this embodiment, the decapsulator 235 and the storing module 225 are coupled). For example, the encapsulation header (e.g., NSH header) includes one or more header fields including metadata information or markers, and the proxy NE stores these header fields.

Figure 3:
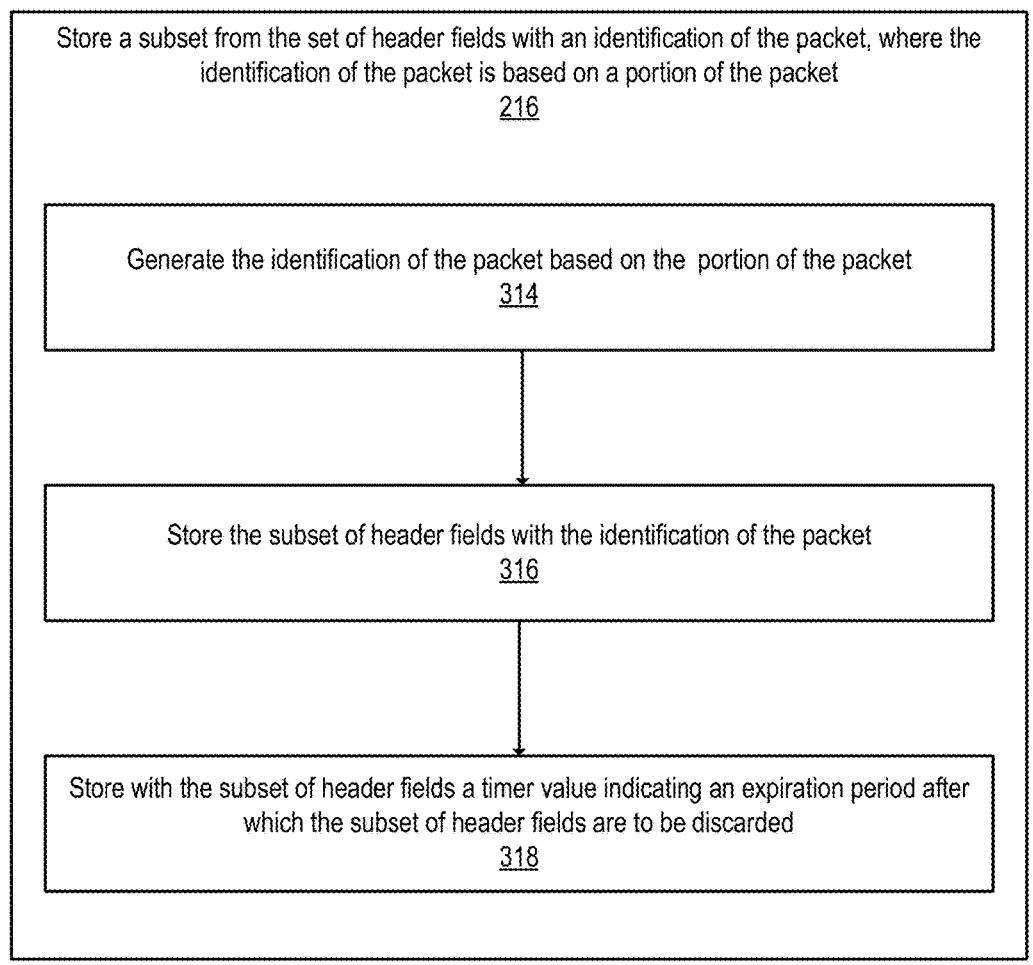
FIG. 3 illustrates a flow diagram of exemplary operations for storing a state of a packet at a proxy network element in accordance with some embodiments of the invention.

FIG. 3 illustrates a flow diagram of exemplary operations for storing a state of a packet at a state-aware proxy network element in accordance with some embodiments. At block 314, the proxy 108 generates the identification of the packet based on the portion of the packet that remains substantially identical prior to and following the processing of the packet at the processing device (e.g., NE 110). In exemplary embodiments, the generation of the identification can be performed by hashing a subset of packet header fields (according to a hashing mechanism), the use of single fields TCP and ESP sequence number, or calculating a key from packet data, etc. The proxy NE calculates the identification (fingerprint) for each packet for which header fields are to be stored using a portion (e.g., a number of bytes) from the header and/or the payload of the packet. This identification is used as a key to retrieve the corresponding header fields when the packet returns following its processing at the NE 110. This identification (fingerprinting) can be viewed as a form of classification.

Table 1 illustrates non-limiting examples of portions of a packet that can be used to generate the identifications (fingerprints) associated with a packet. In some embodiments, the portion of the packet is defined based on a predetermined algorithm when it is known that this portion remains identical prior to and following the processing of the packet at the NE 110. In some embodiments this portion is determined based on the type of the service function hosted on the NE 110. Table 1 further includes exemplary expiration timer values. One would understand that the portion of the packets to be used for generation of the identification, as well as the expiration timer values are provided as informative values only and do not limit the scope of the present invention. As will be described in further details with reference to FIG. 5, a machine learning module 500 may be used to determine for each flow/SF type an appropriate portion of the packet to use for generating the identification associated with stored header fields, as well as for determining the expiration timer values.

TABLE 1

Exemplary portions of packet to use for generation of the identification of a packet and exemplary expiration timer values according to various SF types.

| SF type | Is the header altered following the processing of the packet at the NE 110 | Is the payload altered following the processing of the packet at the NE 110 | Portion of the packet used for generating an identification | Expiration Timer values |
|---|---|---|---|---|
| Forwader (FW) | No | No | Layer 3/4 header | 250 ms |
| NAT | Yes | No | Layer 3/4 header partially and/or partial payload | 300 ms |
| DPI | No | No | Layer 3/4 header | 1000 ms |
| Traffic Shaper | No | No | L3/4 header | Dynamic |
| Hypertext Transfer Protocol proxy | Yes | No | Partial payload | 200 ms |
| Media optimizer | No | Yes | Layer 3/4 Header | 200 ms |
| Header enrichment | Yes | No | Layer 3/4 header partially and/or payload | 200 ms |
| Tunnel encapsulator/ decapsulator | Yes (encapsulation/ decapsulation) | No | Layer 3/4 header with predicted identification and/or payload | 200 ms |
| Encryption | No | Yes | Layer 3 header and/ or packet order | 750 ms |

The flow of operations then moves to block 316 at which the subset of header fields are stored with the identification of the packet at the storage (130, 230). In some embodiments, each header field from the subset includes metadata information/markers that were added by network elements traversed by the packet in the network. In some embodiments, the header fields further include the main NSH header field of the packet. Thus in these embodiments, the stored header fields are the entire NSH header, while in other embodiments, only some of the header fields from the entire header are stored. Flow then moves from block 316 to block 318, at which a timer value indicating an expiration period after which the subset of header fields are to be discarded from the storage is stored with the header fields, and the identification of the packet. This timer value sets a period for which the stored data are to be kept in storage. When this timer value expires, the data is removed from the storage 130 freeing up storage space for additional packet states. In some embodiments, a removal process is periodically performed to identify states with expired timer values and these states are removed from storage freeing up space for states of incoming packets. This prevents the storage 130 from keeping states of expired packets for an indefinite period of time which can cause storage/memory exhaustion in the proxy NE 108.

Referring back to FIG. 2B, flow moves from block 214 to block 216 at which the proxy NE 108 transmits the packet to be processed at the processing device (e.g., NE 110) without the subset of header fields.

FIG. 4 illustrates a flow diagram of exemplary operations for retrieving header fields of a packet at a state-aware proxy network element in accordance with some embodiments. at block 410, in response to receiving a second packet (e.g., 112e) as a result of the processing of the first packet (e.g., 112d) by the processing device NE 110, the proxy NE 108 retrieves the stored subset of markers associated with the first packet according to an identification of the second packet. The identification of the second packet is based on a portion of the second packet that is substantially identical to the portion of the first packet prior to its processing at the processing device. Flow then moves to block 412, at which the proxy 108 encapsulates the packet with a header associated with the packet. In some embodiments, the main header field was previously stored at the storage 103 as one of the subset of header fields and the proxy 108 retrieves (block 422) the stored subset of header fields based on the identification of the packet. In another embodiment, the main header field is not stored at the storage 130 and the proxy NE 108 re-classifies (block 424) the packet to determine the main header field identifying the SFP. Flow then moves to block 414, at which the proxy NE 108 adds the retrieved subset of header fields to the packet. The packet is then transmitted, at block 416, with the header fields to a network element (e.g., NE 104).

Adaptive State-Aware Proxy Device

In some embodiments, to enable automatic learning of the behavior of the processing function (e.g., SF) running on the processing device NE 110 coupled with the proxy device 108 a Machine Learning (ML) module 500 is coupled with the proxy device 108. While the machine learning module 500 is illustrated in FIG. 2A as being within the proxy device 208, the present embodiments are not so limited. The machine learning module 500 may be part of the proxy device 208 while in alternative embodiments, the machine learning module 500 is located within another network element. In some embodiments the machine learning module is part of a network controller (e.g., network controller 120). The machine learning module 500 is coupled with modules of the proxy NE (e.g., the decapsulator 235 and the storage 230) for receiving logs of data transmitted (e.g., a packet log) to the processing device or logs of data stored at the storage device 230 (e.g., header fields, markers included in header fields, expiration time value, identification of the packet, etc.). These logs are used to monitor the behavior of the per-flow packets while traversing the proxy and the processing device NE 110 (e.g., SF) and determine internal delays and packet processing characteristics. In some embodiments, the machine learning module 500 leverages the fact that the proxy NE 208 has direct access to all traffic going in and coming out of the NE 110. As illustrated in FIG. 2A, the machine learning module 500, based on the information received, may determine adjusted parameters for configuring the storing module 225 and/or the second packet marking module 295. While not illustrated the machine learning module 500 may further be used to determine configuration parameters for other elements of the proxy device 208.

Figure 5:
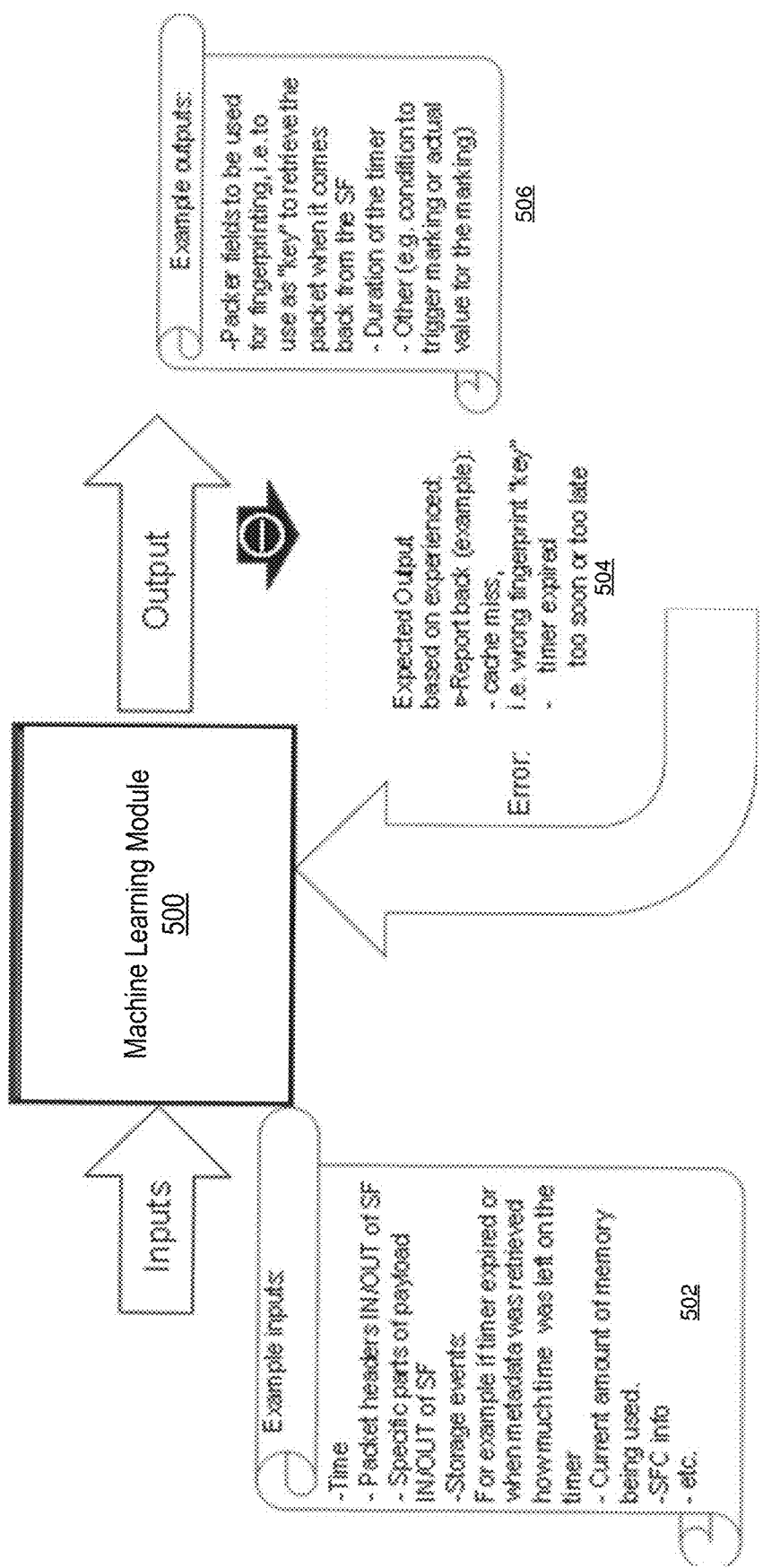
FIG. 5 illustrates a block diagram of an exemplary machine learning module for a state-aware proxy network element in accordance with some embodiments of the invention.

FIG. 5 illustrates a block diagram of an exemplary machine learning module 500 for a state-aware proxy network element in accordance with some embodiments. The machine-learning module 500 is used to learn how the processing device (e.g., NE 110 implementing an SF) coupled with the proxy network element alters the packets that flow through it. In exemplary embodiments, the information gathered at the machine learning module 500 is used to dynamically determine an appropriate identification for a packet of a flow. In an embodiment, the machine learning module 500 ensures that the identification of the packet (i.e., the fingerprint of the packet) is matched with optimal precision such that the proxy network element is able to retrieve corresponding stored data (e.g., main header fields and header fields including metadata) for each packet following its processing at the processing device regardless of how the packet is altered within the processing device.

In additional embodiment, the machine-learning module 500 is operative to learn and keep track of delays occurring when the packets traverse the processing device (NE 110). Based on the learnt behavior of the packets at the processing device, the machine learning module 500 adjusts the timer value indicating the expiration period for stored data to an optimal value. In an exemplary embodiment when proxy NE 130 serves a highly utilized service function (e.g., FW) which drops packets of the traffic, the timer functionality will prevent storage resource (e.g., memory) exhaustion. In this example, the timer value can be adjusted to a smaller value for a given flow of packets if the machine learning module determines that all of packets of this flow are dropped at the NE 110 instead of having the packet states kept in the storage 130 for longer periods of time. When the expiration timer is reliably close to the real delay experienced by flows through the NE 110, the proxy NE can discard stored states optimally, hence saving storage (e.g., memory) resources. In an embodiment, when a state of a packet times out the machine learning module 500 monitors if the timer value was set appropriately and causes the network controller to adjust this timer value for the given flow if the timer is determined not to be set to a proper value.

Thus the machine learning module 500 is operative to determine which identification (e.g., which portion of a packet to use to generate an identification of the packet) to store in the proxy NE 108 to be able to map the packets coming back from the SF to the correct stored state (e.g., main NSH header field and additional header fields including metadata/marker values saved prior to the processing of the packet at the NE 110). The machine learning module 500, may additionally be operative to determine the optimal expiration timer value during which the stored data is to be kept at the storage 230. The determination of the optimal expiration timer value enables an efficient implementation by saving memory resources used by the state-aware proxy NE. The machine learning module 500 may optionally determine the "marker(s)" to be added to the packet (e.g., add the stored state to the packet and additionally mark the packets. In an exemplary embodiment, the second packet marking module 295 may add a timestamp or latency caused by the SF when certain condition are detected by the machine learning module 500 (e.g., the processing delay exceeds a predetermined threshold value based on some ML estimation).

As illustrated in FIG. 5, the machine learning module 500 receives one or more inputs 502 related to the processing of the packet at the proxy NE 208 and at the processing device (NE 110). These inputs may include a time and calendar date, packet header information for packets going in and coming out of the NE 110; partial payload information for packets going in and coming out of the NE 110; storage events such as timer expiration or the value of the timer when the stored data is retrieved for a packet from the storage 130; the amount of resources used in proxy NE for the packet (e.g., the amount of memory used to store the state of the particular packet, etc.). The machine learning module 500 may further receive additional information related to the processing of the packet at the NE 110 and/or the proxy NE 208. The inputs of the machine learning module 500 may also include errors 504 (e.g., a cache miss (i.e., wrong identification of the packet (fingerprint/key), if a timer expired too soon or too late, expected output vs. experienced output, etc.).

Based on gathered data (inputs 502, and 504), the machine learning module 500 determines one or more outputs to be used for determining an adaptive configuration of the state-aware proxy 108. The machine learning module 500 causes the proxy NE 208 to adapt during the processing of a flow of packets to the behavior of this flow at the proxy NE 208 as well as its behavior at the NE 110. In some embodiments, the outputs 506 are: a) the packet portion to be used for generating the identification of the packet (i.e., the fingerprint or key to be used to save and restore the main NSH header field and header fields including metadata/markers for a particular flow of packets); b) an optimal time to set for storage of data for each packet of a flow (e.g., the expiration timer value after which the stored state is to be discarded and removed from the storage 230); and the outputs may optionally include other values associated for the marking of packets by the proxy NE (e.g., conditions for triggering the marking of packets at the second packet marking module 295, and/or value for the markers). Example machine learning techniques that can be used for this function are artificial neural networks (NN), support vector machines (SVM), or other.

In some embodiments, to determine the portion to use to generate an identification of the packet, the ML module 500 processes packet headers and payloads entering and returning from the NE 110. In some embodiments, this portion remains substantially identical prior to and following the processing of the packets at the NE 110. In an embodiment, this portion is unique between packets and remains the same or is predictable through the NE 110. In an embodiment, the identification of the packet is based on a first and a second portion of the packet, where the first portion of the packet is used to generate the identification prior to the processing of the packet at the NE 110 and the second portion of the packet is used to generate the identification following its processing at the NE. The first and the second portion can be different and determined based on historical data acquired during processing of packets of a same flow. For example, a TCP flow going through an SF that encrypts traffic into IPsec packets might have correlation between TCP sequence number and the sequence number in the Encapsulating Security Payload (ESP) header. The learned information can be used for the storing module 225 to select the optimal fields (portions of the packet) to use as an identification of the packet (a fingerprint/key). In exemplary embodiments, the generation of the identification can be performed by a hashing of a subset of packet header fields, the use of single fields TCP and ESP sequence number, or calculating a key from packet data etc. In addition, the ML module 500 is used to determine which markers to apply to the packets based on observed behavior or anomalies.

In some embodiments, the ML module 500 is used to determine the optimal expiration timer value for packets of a flow. The ML module 500 can use timed packet events and timer events and packet identifications (fingerprints/key) from the storage 230 to learn the optimal delay through the NE 110 and to predict the delay based on learned behavior per traffic type. In some embodiments, each traffic type could cause the NE 110 to behave differently. The ML's output can be fed back to the proxy NE 108 (for example to the storing module 225) to adjust the expiration timer during the storing process. In additional embodiments, when a stored state expires, this event can trigger additional feedback (which can be performed offline) in the ML module 500 to verify that the state was not cleared too early if for example the SF buffered the packet for an unexpectedly long period of time. In addition, the ML module 500 may further receive, when stored data is matched to a packet returning from the NE 110, the value of the timer at the moment of matching to adjust the expiration timer value for those packets.

In some embodiments, the ML module 500 may further be used to determine additional marking to be performed at the proxy NE 208 (e.g., through the second packet marking module 295). The proxy NE 108 is operative (e.g., as configured by the network controller 120) to also participate in the marking of packets. The marking could be triggered by various conditions such as thresholds reached, the behavior (e.g., delay, loss, modification) experienced by packets coming in and out of the NE 110, etc. The markers may be determined by the ML module 500 (such as probable packet header fields present that cause the extra latency, or loss of packets etc.) The proxy NE 208 may further be configured to bypass the marking for packets of some flows and just notify a controller (e.g., the network controller 120) when a condition is triggered by the ML module 500.

Configuration of the State-Aware Proxy Network Element:

In some embodiments the proxy network element 108 is operative to be configured by a network controller 120. In some embodiments, an interface between the network controller 120 and the proxy NE 108 is added. The interface is used to enable or disable packet marking functionality at the proxy NE 108; configure/read the functionality based on the SF type (e.g., NAT, FW, DPI, IDS, etc.); configure/read optimization process data (e.g., determining optimal portion of the packet to use for generating the identification of the packet, determining an optimal expiration timer value, etc. . . . ); configure identification data, and timer values; collect timer expiration, thresholds reached or other statistics related to the processing of the packets at the Proxy NE 108, and/or at the processing device (NE 110).

The interface coupling the network controller with the proxy NE 208 can be implemented according to different embodiments. In exemplary embodiments, the interface can be implemented with extensions to the OpenFlow standard, The Network Configuration Protocol (Netconf), REpresentational State Transfer (REST), command-line interface (CLI), or any other protocol enabling communication between the network controller 120 and the proxy NE 108.

In an embodiment, the protocol used between the proxy NE 208 and the network controller 120 depends on how the SFC functionality is implemented and in what kind of network element it resides. In some embodiments, if the SFC is implemented within an OpenFlow switch then the OpenFlow protocol is extended to enable the use and configuration of a state-aware proxy NE as described with references to FIGS. 1-5.

In an embodiment, the OpenFlow protocol can be extended through protocol extension. In an exemplary embodiment, an OpenFlow extension may be used to describe that if a packet matches a matching rule (e.g., a packet of a predetermined port) predefined metadata/markers from the header of the packet (e.g., the NSH header) are to be stored at the storage 230.

For example, an OpenFlow rule may be installed at the proxy NE 108 for handling incoming packets (e.g., "in_port=23, eth_type=NSH, NSH_MD_TYPE=2, actions=NSH_POP, NSH_MD_STORE=NAT, output:24," such that a state of all packets coming in through the port 23 is to be stored). In this example, the rule indicates that each packet received through the port 23, the proxy NE 208 determines whether the packet has an NSH packet. If the packet does have an NSH packet, the proxy NE 208 determines whether the packet/NSH header includes markers of type 2, and if the markers are of type 2, the proxy NE 108 execute a set of actions on the packet. These actions include decapsulating the packet by removing the NSH header and storing the markers (and optionally the NSH header).

Another OpenFlow rule may be installed at the proxy NE 208 for handling outgoing packets (i.e., packets received back from the processing device 110 and for which markers are retrieved and added: e.g., "in_port=24, actions=NSH_MD_LOOKUP=NAT, NSH_PUSH, output: 23")

In this case the second rule is used to cause the proxy NE 208 to encapsulate all packets coming from port 24. Prior to encapsulating the packet the OpenFlow switch (acting as a SFC proxy in this example) will interpret this rule and will look for metadata/markers with an identification (fingerprint/key) suitable for a service function of type NAT and if found, it will use the markers to encapsulate the packet. In some embodiments, the switch discards the stored markers following their incorporation in the encapsulated packet.

The embodiments of the present invention provide methods and apparatuses of a state-aware proxy network element for retaining per packet metadata/markers when a packet is decapsulated prior to being processed at a processing device. The embodiments described with reference to FIGS. 1-5 can be implemented for any type of proxy network element which needs to restore full packet header information following the decapsulation of the packet and its processing at another processing device. In some exemplary embodiments, the present embodiments provide a method in a SFC proxy network element for storing and retrieving header markers of a NSH header.

The embodiments described with reference to FIGS. 1-5, provide an efficient implementation of state-aware proxies (e.g., with an example of SFC proxy) using machine learning to automatically adjust the use of the resources of the proxy (such as memory). These embodiments further provide a state-aware proxy, enabling retrieval of all packet information following the decapsulation of the packet, and its processing at another network element. The proxy network elements stores along with the metadata information and the header of the packet an identification of the packet, enabling the proxy to accurately retrieve the stored information following the processing of the packet at the other network element. The proxy network element is further operative to apply performance monitoring markings and to generally collect additional information on modified or dropped packets in the other network element (e.g., SF). This additional information (e.g., statistics) can be sent to a network controller or transmitted by packet metadata marking to be consumed by another network element down the path.

While the embodiments described above illustrate the example of a SFC network including an SFC Proxy and NSH header marking, the discussed embodiments are not so limited. The present methods described with reference to operations at the proxy NE 108 apply to any other types of proxies that need to restore full packet header information, optionally perform the packet markings, and do so efficiently to handle high throughputs.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
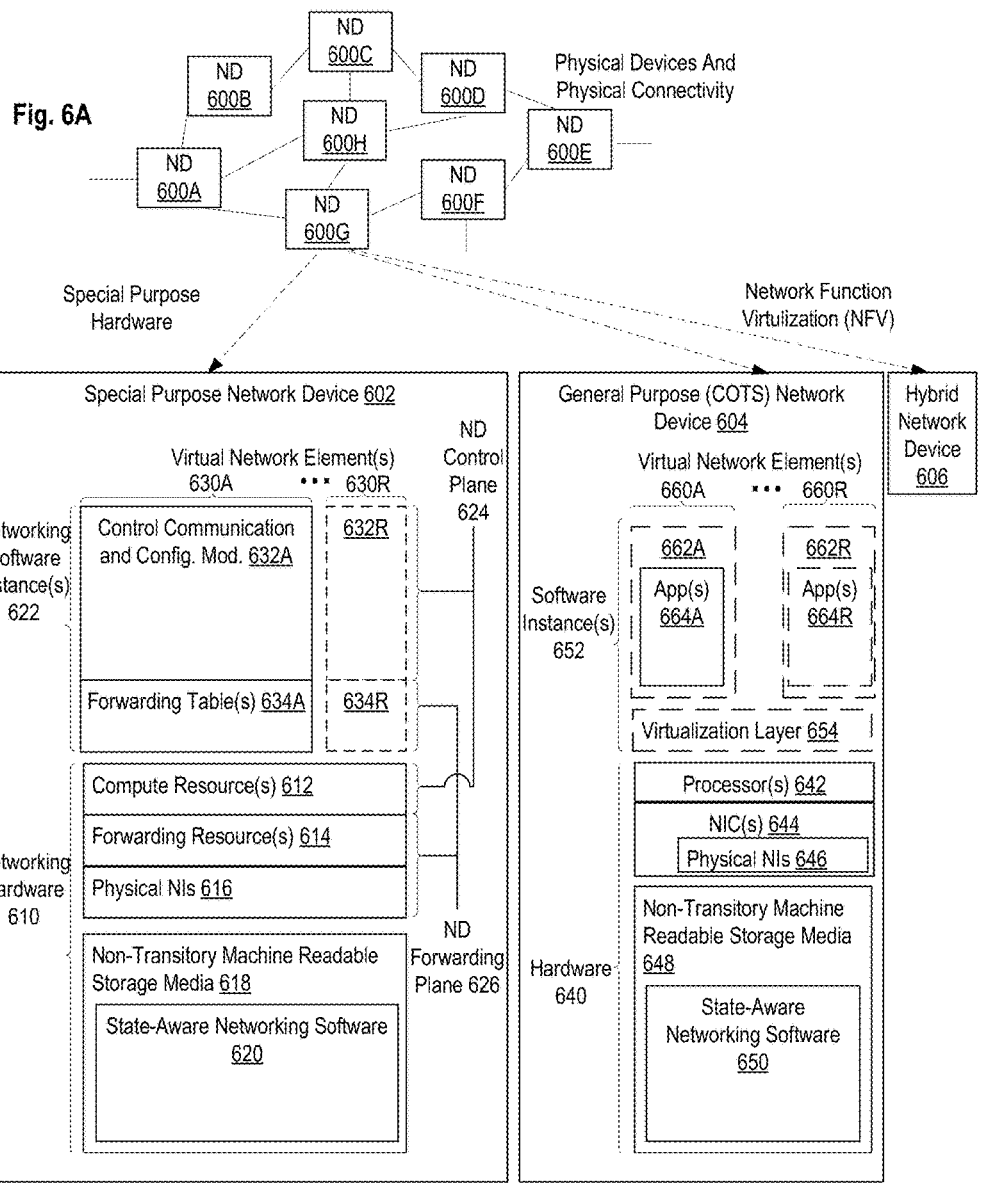
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). State-Aware Networking Software 620 can include code which when executed by networking hardware 610, causes networking hardware 610 to perform operations of one or more embodiments of the present invention as part of networking software instances 622, as described with respect to the proxy NE of FIGS. 1-5. The network elements of FIGS. 1-5 may be implemented as the NE or VNE of ND 602 or 604. Further the proxy NE may be distributed on multiple NDs.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical Ms 616 based on the forwarding table(s) 634A-R.

Figure 6B:
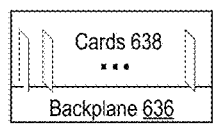
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)). Software 650 can include code which when executed by processor(s) 642, cause processor(s) 642 to perform operations of one or more embodiments of the present invention as part software containers 662A-R.

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 6C:
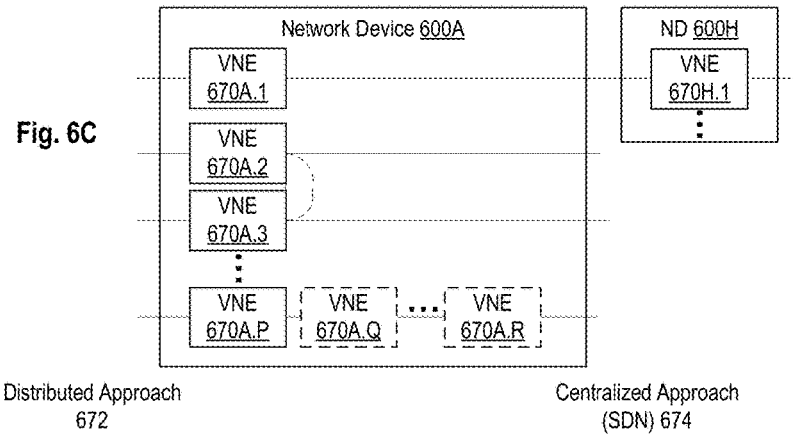
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., fault detection and processing).

Figure 6D:
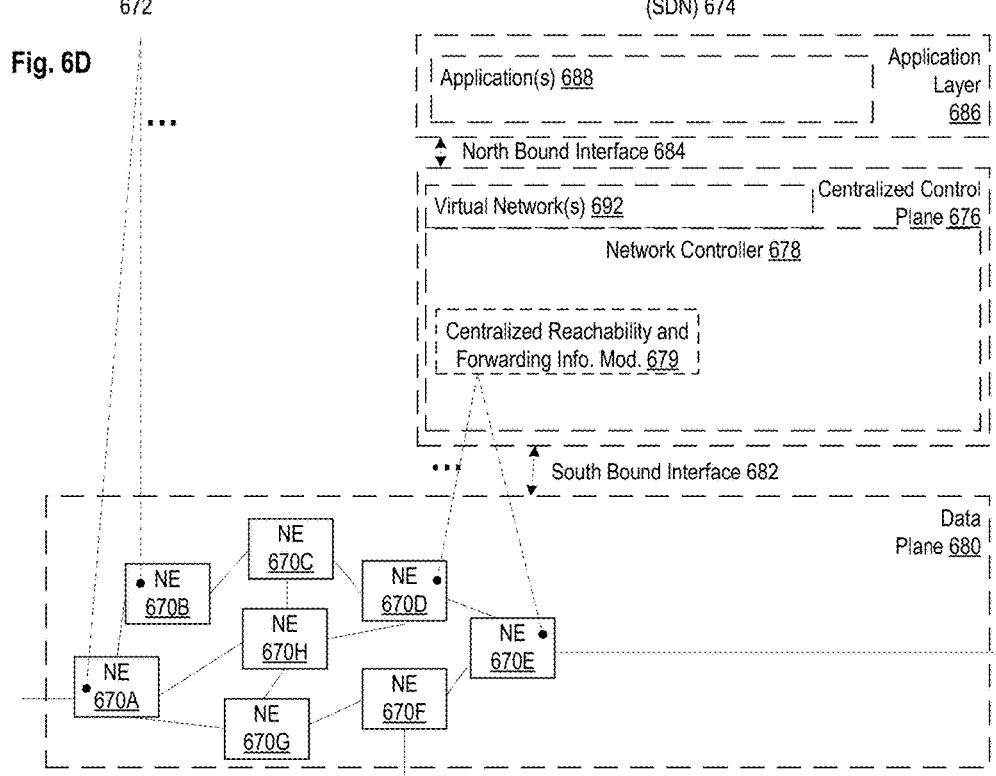
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
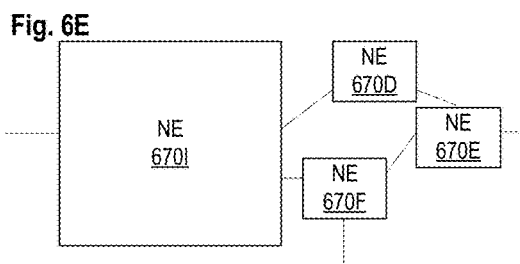
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
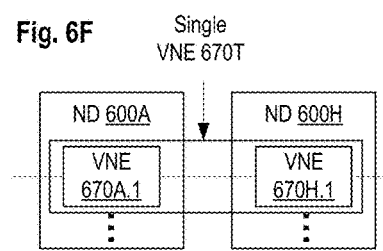
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
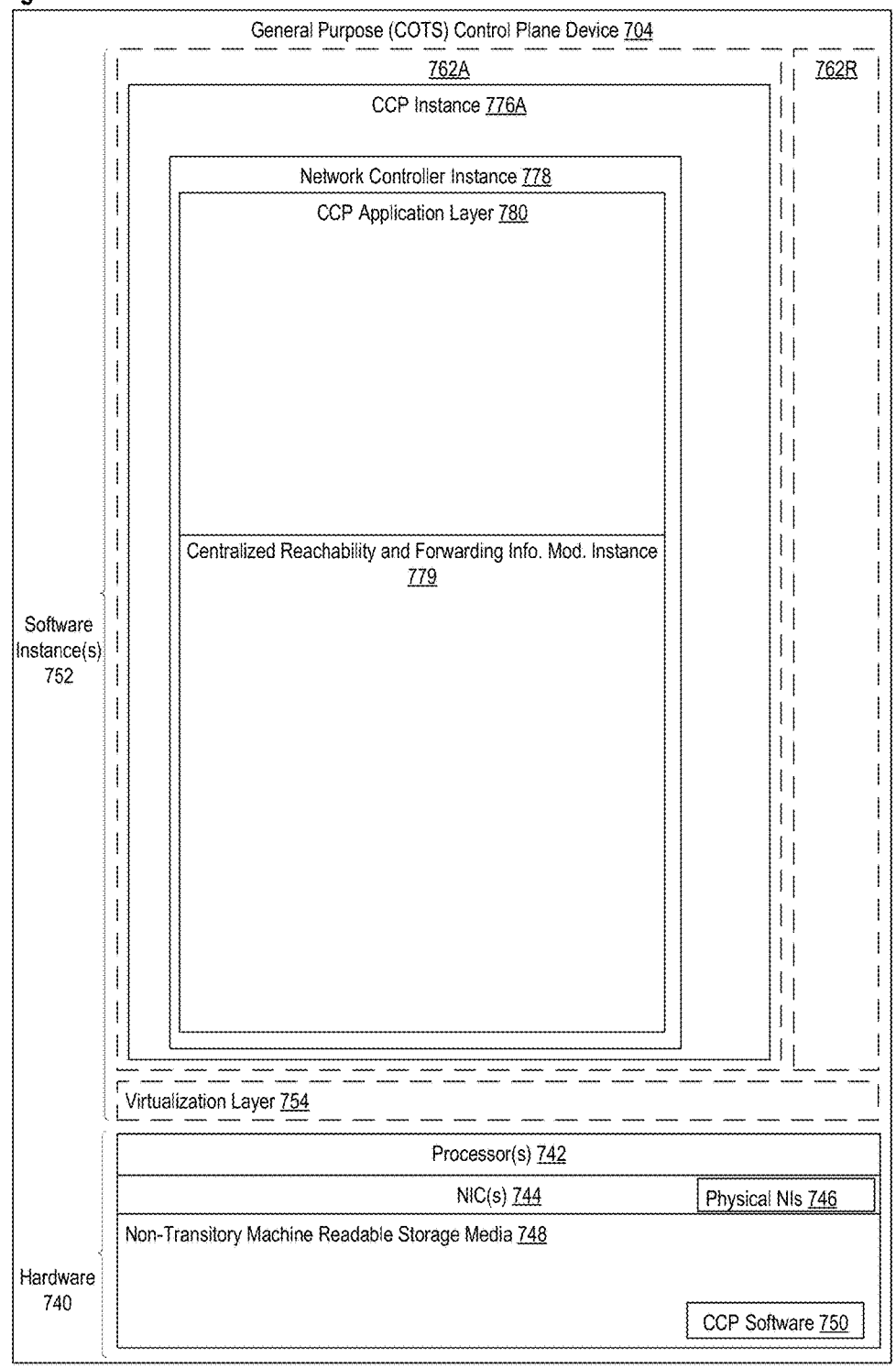
FIG. 7 illustrates a general purpose control plane device with centralized control plane (CCP) software, according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a virtualization layer 754 and software container(s) 762A-R (e.g., with operating system-level virtualization, the virtualization layer 754 represents the kernel of an operating system (or a shim executing on a base operating system) that allows for the creation of multiple software containers 762A-R (representing separate user space instances and also called virtualization engines, virtual private servers, or jails) that may each be used to execute a set of one or more applications; with full virtualization, the virtualization layer 754 represents a hypervisor (sometimes referred to as a virtual machine monitor (VMM)) or a hypervisor executing on top of a host operating system, and the software containers 762A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 750 (illustrated as CCP instance 776A) is executed within the software container 762A on the virtualization layer 754. In embodiments where compute virtualization is not used, the CCP instance 776A on top of a host operating system is executed on the "bare metal" general purpose control plane device 704. The instantiation of the CCP instance 776A, as well as the virtualization layer 754 and software containers 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a network device including a proxy network element coupled with a processing device, wherein the processing device includes a service function, the method comprising:
   receiving, at the network device, a packet with a network service header (NSH) header including a set of header fields, wherein the header fields include one or more NSH header markings, wherein each NSH header marking includes metadata added to the NSH header by a service function traversed by the packet prior to reaching the network device;
   storing a subset from the set of header fields with an identification of the packet and a timer value indicating an expiration period after which the stored subset of header fields are to be discarded, wherein the identification of the packet is a fingerprint generated based on a portion of the packet that remains substantially identical prior to and following the processing of the packet at the processing device for potential usage of the subset of header fields if the packet is received at the network device including the proxy networking element following its processing at the processing device; and
   transmitting, from the network device to the processing device, the packet without the subset of the header fields and without the NSH header to be processed at the processing device.

2. The method of claim 1, wherein the packet is a first packet, the method further comprising:
   in response to receiving a second packet as a result of processing the first packet at the processing device, retrieving the subset of header fields according to an identification of the second packet, wherein the identification of the second packet is generated based on the portion of the packet that remains substantially identical prior to and following the processing of the packet at the processing device;
   adding the retrieved subset of header fields to an NSH header of the second packet, wherein the header fields include one or more NSH header markings; and
   transmitting the second packet with the retrieved subset of header fields to another network device.

3. The method of claim 1, wherein the portion of the packet is dynamically determined based on a machine learning algorithm.

4. The method of claim 1, wherein the portion of the packet is defined based on a type of the service function.

5. The method of claim 2, wherein the identification of the first packet is based on a first portion of the first packet, and the identification of the second packet is based on a second portion of the second packet, wherein the first and second portions are determined dynamically based on a machine learning algorithm.

6. The method of claim 5, wherein the first portion and second portion are different.

7. The method of claim 2, further comprising re-classifying the second packet to determine the NSH header, and encapsulating the second packet with the NSH header.

8. A network device including a proxy network element that is to be coupled with a processing device, wherein the processing device includes a service function, comprising:
   a set of one or more processors; and
   a non-transitory computer readable storage medium coupled with the set of one or more processors, storing instructions that when executed by the set of one or more processors cause the network device to:
      receive, at the network device, a packet with a network service header (NSH) header including a set of header fields associated with the packet, wherein the header fields include one or more NSH header markings, wherein each NSH header marking includes metadata added to the NSH header by a service function traversed by the packet prior to reaching the network device;
      store a subset from the set of header fields with an identification of the packet and a timer value indicating an expiration period after which the stored subset of header fields are to be discarded, wherein the identification of the packet is a fingerprint generated based on a portion of the packet that remains substantially identical prior to and following the processing of the packet at the processing device for potential usage of the subset of header fields if the packet is received at the network device including the proxy networking element following its processing at the processing device; and
      transmit, from the network device to the processing device, the packet without the subset of the header fields and without the NSH header to be processed at the processing device.

9. The network device of claim 8, wherein the packet is a first packet, and the network device is further to:
   in response to receiving a second packet as a result of processing the first packet at the processing device retrieve the subset of header fields according to an identification of the second packet, wherein the identification of the second packet is generated based on the portion of the packet that remains substantially identical prior to and following the processing of the packet at the processing device;
   add the retrieved subset of header fields to an NSH header of the second packet, wherein the header fields include one or more NSH header markings; and
   transmit the second packet with the retrieved subset of header fields to another network device.

10. The network device of claim 8, wherein the portion of the packet is dynamically determined based on a machine learning algorithm.

11. The network device of claim 8, wherein the portion of the packet is defined based on a type of the service function.

12. The network device of claim 9, wherein the identification of the first packet is based on a first portion of the first packet, and the identification of the second packet is based on a second portion of the second packet, wherein the first and second portions are determined dynamically based on a machine learning algorithm.

13. The network device of claim 12, wherein the first portion and second portion are different.

14. The network device of claim 9, wherein the storage medium includes further instructions that when executed by the set of one or more processors cause the network device to re-classify the second packet to determine the NSH header, and encapsulate the second packet with the NSH header.

* * * * *